Patented Feb. 10, 1953

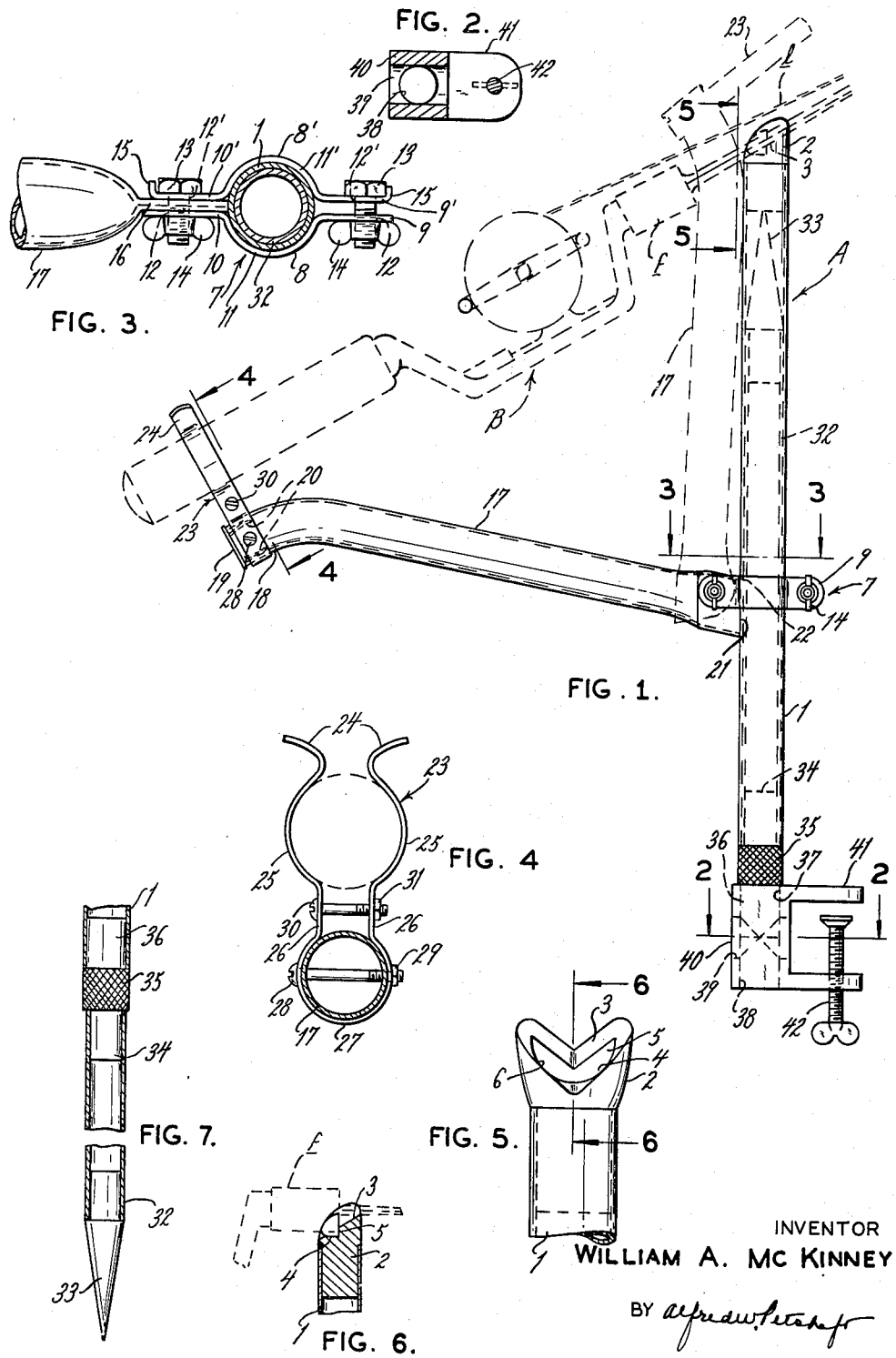

2,628,048

UNITED STATES PATENT OFFICE 2,628,048

FISHING ROD HOLDER

William A. McKinney, Normandy, Mo.

Application October 3, 1949, Serial No. 119,365

2 Claims. (Cl. 248—42)

This invention relates in general to certain new and useful improvements in rod holder devices and more particularly to a fishing rod holder.

It is the primary object of the present invention to provide a fishing rod holder which is simple in construction, light in weight, and may be compactly folded up to occupy a relatively small amount of space.

It is a further object of the present invention to provide a fishing rod holder which is extremely strong and may be readily adjusted to support various types and sizes of fishing rods in various positions and at various selected angles, as may be deemed desirable by the user.

It is another object of the present invention to provide a fishing rod holder of the type stated having unique handle clamping means which may be readily adjusted both in size and degree of spring tension for properly gripping fishing rod handles of various shapes and sizes.

It is also an object of the present invention to provide a fishing rod holder of the type stated which may be quickly and conveniently clamped to the gunwale of a boat, the edge of a dock or in the earth along the bank of a stream or shore of a lake and, when so mounted, will readily swivel, responsive to varying pull on the fishing line so that the longitudinal axis of the fishing pole will constantly be maintained in alignment with the direction of pull along the line.

It is also an object of the present invention to provide a fishing rod holder of the type stated incorporating movement limiting or stop means to prevent the fishing rod from being accidentally pulled too far outwardly along the holder and torn loose therefrom.

With the above and other objects in view, my invention resides in the novel features of form, construction, arrangement, and combination of parts presently described and pointed out in the claims.

Figure 1 is a side elevational view of the fishing rod holder constructed in accordance with and embodying the present invention;

Figures 2, 3, 4, and 5 are fragmentary sectional views taken along lines 2—2, 3—3, 4—4, and 5—5, respectively, of Figure 1;

Figure 6 is a fragmentary sectional view taken along line 6—6 of Figure 5, and

Figure 7 is a fragmentary partially sectional view of the lower portion of the post and the spike.

Broadly speaking, the present invention comprises a vertical tubular member provided at its inner end with a yoke-like rest for receiving the shaft of a fishing rod. The lateral swingable, tubular boom is provided at its outer end with clamping means for engaging the enlarged or butt end of the fishing rod handle. Disposed within the tubular member is an elongated spike-like element having an outwardly projecting end sized for snug fitting but rotatable disposition within an enlarged bight portion of a C-clamp. The C-clamp is preferably arranged with three different sockets or apertures into which the support may be fitted so that the fishing rod holder may be readily clamped upon any kind of supporting structure such as the gunwale of a boat, the edge of a boat seat, the edge of a dock, or the like. When desired the spike-like member may be withdrawn from the tubular member and turned end for end so that its projected end portion will fit snugly within the end of the tubular member as in a socket. The projecting spike portion may thereupon be jammed into the soft earth along a river bank, lakeshore, or where the C-clamp cannot be used.

Referring now in more detail and by reference characters to the drawing which illustrates a preferred embodiment of the present invention, A designates a fishing rod holder comprising an elongated tubular post 1, preferably constructed of aluminum or stainless steel tubing, so as to be attractive in appearance and substantially rust-proof. Jam-fitted or otherwise rigidly fixed in the upper end of the post 1 is a forged or cast-end fitting 2, the upper end of which is symmetrically formed to provide a downwardly and rearwardly inclined V-shaped notch 3. The rear section of which is undercut as at 4 to provide a vertical shoulder 5 and a somewhat semi-circular ledge 6.

Adjustably mounted upon the post 1 is a clamp 7 comprising a pair of opposed clamp-forming straps 8, 8', integrally including straight sections 9, 10, and 9', 10', respectively connected by semi-circular central sections 11, 11', the latter being sized for snug embracing engagement around the post 1. The opposed pairs of straight sections 9, 9', 10, 10', are provided with aligned apertures 12, 12', for receiving hexagonally headed bolts 13 which extend therethrough and are provided on their threaded ends with wing nuts 14. The straight sections 9', 10', are finally provided with upstanding locking ears 15, for engagement against the heads of the bolts to prevent the latter from turning when the wing nuts 14 are screwed tightly down in place. Swingably mounted upon the shank of one of the bolts 13 and frictionally held between the straight sections 9, 9', is the flattened or fish-tailed end 16 of a tubular boom member 17, which is curved outwardly as at 18 adjacent its outer end and in its outer end is provided with an ornamental closure plug 19 retained in place by spring-arms 20. As will be noted in Figure 1, the flattened or fish-tailed end 16 of the boom 17 is mounted upon the bolt 13 in off-center relation and is cut off at its upper end, as at 22, along an arc concentric with the center line of the bolt 13 so that the boom 17 may be swung upwardly into the position shown in dotted lines in Figure 1, for the sake of compactness, or can be swung downwardly in the position, as shown in full lines in Figure 1, in which position the margin 21 will function as a stop.

Mounted encirclingly around the outer end of the boom 17 is a spring clamp 23 integrally including outwardly diverging lips 24 which lead into oppositely curved and juxtaposed arcuate gripping sections 25, which are, in turn, connected by short neck portions 26 to a circular bight portion 27 disposed in snug fitting engagement, embracingly around the outer end of the boom 17. The spring clamp 23 is held rigidly in place by a bolt 28 which extends diametrally through the bight portion 27 and the boom 17, being provided at its projecting threaded end with a retaining nut 29. Also extending transversely through the neck portions 26 of the spring clamp 23, in spaced parallel relation to the bolt 28, is an adjustment screw 30, which is provided on its threaded end with a nut 31 for permitting adjustment of the space and tension between the gripping sections 25, to accommodate various sizes and shapes of fishing rod handles.

Slidably telescoped within the tubular post 1 is a tubular spike 32 provided at its inner end with a rigidly secured, forged or cast, point 33. Shrunk or otherwise rigidly mounted within the opposite end of the tubular spike member 32 is an end fitting 34 provided midway of its ends with a diametrally enlarged, externally knurled collar 35 substantially equal in diametral size to the outside diametral size of the post member 1 and being of sufficient axial length to provide a convenient finger grip to facilitate manipulation. Below the collar 35 is a cylindrical swivel-forming plug 36 adapted for snug-fitting, rotative engagement optionally within any one of the three bore-holes 37, 38, 39, formed in an enlarged bight-box 40 of a C-clamp 41 having a conventional clamp screw 42 for securement in the usual manner to the gunwale, or to an edge of a boat seat, or the like. If the C-clamp 41 is mounted with the clamp screw 42 in horizontal position, the plug 36 will be mounted in the bore-hole 38 and, similarly, if the C-clamp 41 is mounted in upside down relation (reference being made to Figure 1) the plug member 36 is mounted in the bore-hole 39.

With the C-clamp 41 properly mounted, the boom member 17 may be swung downwardly and a fishing rod mounted, as shown in Figure 1. As the bait moves around in the water, or as the line is pulled from side to side when a fish makes a strike, the entire fishing rod support A will swing around in response to the slightest tug on the line so that the longitudinal axis of the fishing rod B is always aligned with the direction of pull on the fish line *l*.

When it is desired and necessary to set up the fishing rod holder A on a stream bank or lakeshore the C-clamp 41 is removed. The spike member 32 is then pulled out and turned end for end so that the plug 36 is inserted into the lower end of the post member 1. Whereupon the pointed end is jammed into the soft earth of the river bank at the appropriate or desired angle and the fishing rod B appropriately mounted therein.

It should be noted that the boom 17 may be swung upwardly toward vertical position and within the limits of its movement may be clamped in any intermediate position by tightening the wing nut so as to adjust the angle of inclination of the fishing rod B. Similarly, by slightly loosening both wing nuts 14 the clamp 7 may be swung upwardly and downwardly along the post 1 to provide further means for adjusting the angle of inclination of the fishing rod B and accommodating the fishing rod holder A to handles of various lengths.

Finally, it will be noted that if a large fish should accidentally strike the bait while the fisherman's attention is wandering and for some reason the fishing rod B should be jerked forward and outwardly with a very sudden motion, the boom 17 will swing upwardly and forwardly under the heavy pull and the handle ferrule *f* will ride onto the circular ledge and abut against the shoulder 5, thereby preventing the rod B from being pulled entirely out of the fishing rod holder A.

It should be understood that changes and modifications in the form, construction, arrangement, and combination of the several parts of the fishing rod holder may be made and substituted for those herein shown and described without departing from the nature and principle of my invention.

Having thus described my invention what I claim and desire to secure by Letters Patent is:

1. A fishing-rod holder comprising a post adapted to be supported in substantially vertical position and being provided at its upper end with an upwardly opening notch for loosely receiving a fishing-rod, a fitting disposed encirclingly around, and slidably engaged with, the post for adjustment lengthwise with respect thereto, means for locking the fitting in any selected position of adjustment, a hinge-forming element formed on the fitting and disposed radially outwardly with respect to the post, a boom swingably mounted on the hinge-forming element and having an abutment-forming end face at the hinged end of the boom disposed angularly with respect to the longitudinal axis of the boom and positioned to abuttingly engage the face of the post for limiting its outward swinging movement, and means on the outer end of the boom for gripping the handle of a fishing rod.

2. A fishing-rod holder comprising a post adapted to be supported in substantially vertical position and being provided at its upper end with a fitting having an upwardly opening notch for loosely receiving a fishing-rod, said fitting further being provided in the region of the notch with a ledge for stopwise abutment against the handle of the fishing rod to prevent the rod from sliding longitudinally through the fitting beyond the handle, a fitting disposed encirclingly around, and slidably engaged with the post for adjustment lengthwise with respect thereto, means for locking the fitting in any selected position of adjustment, a hinge-forming element formed on the fitting and disposed radially outwardly with respect to the post, a boom swingably mounted on the hinge-forming element and having an abutment-forming end face at the hinged end of the boom disposed angularly with respect to the longitudinal axis of the boom and positioned to abuttingly engage the face of the post for limiting its outward swinging movement, and means on the outer end of the boom for gripping the handle of a fishing rod.

WILLIAM A. McKINNEY.

REFERENCES CITED

The following references are of record in the file of this patent:

UNITED STATES PATENTS

| Number | Name | Date |
|---|---|---|
| 368,367 | Aiken et al. | Aug. 16, 1887 |
| 919,981 | Unger | Apr. 27, 1909 |
| 1,283,511 | Heidtmann | Nov. 5, 1918 |
| 2,211,278 | Febre | Aug. 13, 1940 |
| 2,311,823 | Gaskill | Feb. 23, 1943 |
| 2,481,272 | Williams | Sept. 6, 1949 |
| 2,492,323 | Roell | Dec. 27, 1949 |
| 2,518,908 | Korns | Aug. 15, 1950 |
| 2,522,255 | Climo | Sept. 12, 1950 |